United States Patent
Lydecker et al.

(10) Patent No.: US 11,718,389 B2
(45) Date of Patent: Aug. 8, 2023

(54) METHODS AND APPARATUS TO RECOVER ROTORCRAFT

(71) Applicant: Insitu, Inc., Bingen, WA (US)

(72) Inventors: Jeffrey David Lydecker, Hood River, OR (US); Rolf Rysdyk, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 17/834,439

(22) Filed: Jun. 7, 2022

(65) Prior Publication Data

US 2022/0297826 A1 Sep. 22, 2022

Related U.S. Application Data

(62) Division of application No. 16/149,920, filed on Oct. 2, 2018, now Pat. No. 11,377,207.

(51) Int. Cl.
| | |
|---|---|
| *B64C 25/68* | (2006.01) |
| *B64C 27/32* | (2006.01) |
| *B64C 39/02* | (2023.01) |
| *B64U 10/10* | (2023.01) |
| *B64U 30/20* | (2023.01) |
| *B64U 70/30* | (2023.01) |

(52) U.S. Cl.
CPC ............. *B64C 25/68* (2013.01); *B64C 27/32* (2013.01); *B64C 39/024* (2013.01); *B64U 10/10* (2023.01); *B64U 30/20* (2023.01); *B64U 70/30* (2023.01)

(58) Field of Classification Search
CPC ... B64C 25/68; B64C 27/32; B64C 2201/024; B64C 2201/108; B64C 2201/182
See application file for complete search history.

(56) References Cited

U.S. PATENT DOCUMENTS

| | | | |
|---|---|---|---|
| 2,552,115 | A | 5/1951 | Replogle |
| 6,874,729 | B1 | 4/2005 | McDonnell |
| 8,348,193 | B2 | 1/2013 | McGreer et al. |
| 10,293,929 | B2 * | 5/2019 | von Flotow ............. B64D 5/00 |
| 2012/0299450 | A1 | 11/2012 | Bourget et al. |
| 2013/0320138 | A1 | 12/2013 | Dickson et al. |
| 2016/0368599 | A1 | 12/2016 | Nagasaki et al. |
| 2017/0284371 | A1 * | 10/2017 | Gamble .................. B64C 27/52 |
| 2017/0369185 | A1 * | 12/2017 | Grubb ..................... B64F 1/029 |

(Continued)

FOREIGN PATENT DOCUMENTS

| | | |
|---|---|---|
| EP | 3296199 | 3/2018 |
| WO | 9802350 | 1/1998 |

OTHER PUBLICATIONS

European Patent Office, "Extended European Search Report," issued in connection with European Patent Application No. 19201025.4, dated Feb. 19, 2020, 8 pages.

(Continued)

*Primary Examiner* — Justin M Benedik
(74) *Attorney, Agent, or Firm* — Hanley, Flight & Zimmerman, LLC

(57) ABSTRACT

Methods and apparatus to recover rotorcraft are disclosed. A disclosed example apparatus includes a rotor of a vehicle, a rotatable hub to support the rotor, and a rotor hook disposed on the rotor. The rotor hook has a groove to receive a recovery line. The rotor is to contact the recovery line when the vehicle is flown toward the recovery line.

20 Claims, 5 Drawing Sheets

(56) References Cited

U.S. PATENT DOCUMENTS

2020/0102070 A1    4/2020   Lydecker et al.

OTHER PUBLICATIONS

European Patent Office, "Communication pursuant to Article 94(3) EPC," issued in connection with European Patent Application No. 19201025.4, dated Feb. 26, 2021, 5 pages.

United States Patent and Trademark Office, "Restriction/Election Requirement," issued in connection with U.S. Appl. No. 16/149,920, dated Jan. 26, 2021, 6 pages.

United States Patent and Trademark Office, "Non-Final Office Action," issued in connection with U.S. Appl. No. 16/149,920, dated Apr. 12, 2021, 16 pages.

United States Patent and Trademark Office, "Final Office Action," issued in connection with U.S. Appl. No. 16/149,920, dated Sep. 3, 2021, 20 pages.

United States Patent and Trademark Office, "Notice of Allowance and Fee(s) Due," issued in connection with U.S. Appl. No. 16/149,920, dated Mar. 9, 2022, 7 pages.

\* cited by examiner

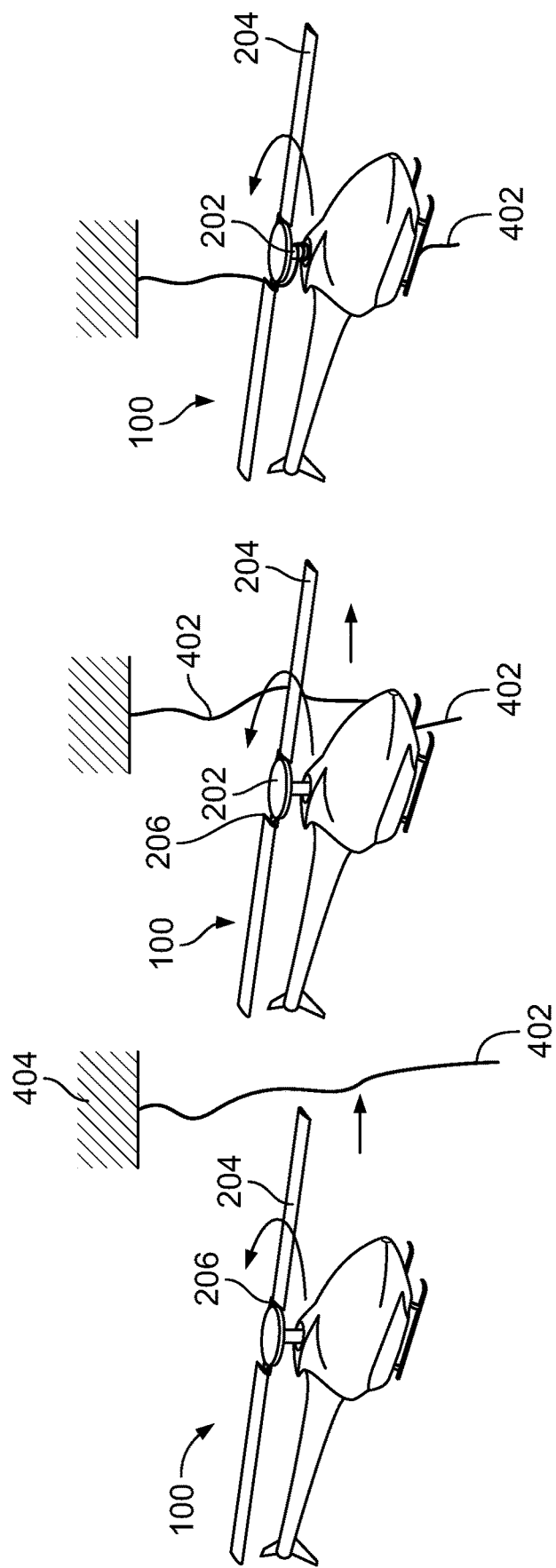

METHODS AND APPARATUS TO RECOVER ROTORCRAFT

RELATED APPLICATION

This patent arises as a divisional of U.S. patent application Ser. No. 16/149,920, which was filed on Oct. 2, 2018. U.S. patent application Ser. No. 16/149,920 is hereby incorporated herein by reference in its entirety. Priority to U.S. patent application Ser. No. 16/149,920 is hereby claimed.

FIELD OF THE DISCLOSURE

This disclosure relates generally to aircraft and, more particularly, to methods and apparatus to recover rotorcraft.

BACKGROUND

In recent years, aircraft, such as rotorcraft, have been implemented as unmanned aerial vehicles (UAVs) or drones to fly across significant distances to transport payloads (e.g., packages, supplies, equipment, etc.) or gather information. Some rotorcraft UAVs land on landing pads. Features and/or components implemented to allow these rotorcraft UAVs to land on landing pads can add weight, drag, complexity and cost to a UAV. Further, a landing process of a UAV rotorcraft can take a significant amount of time.

SUMMARY

An example apparatus includes a rotor of a vehicle, a rotatable hub to support the rotor, and a rotor hook disposed on the rotor. The rotor hook has a groove to receive a recovery line. The rotor is to contact the recovery line when the vehicle is flown toward the recovery line.

An example method of recovering an aircraft includes moving the aircraft toward a suspended recovery line, contacting a portion of a rotor of the aircraft with the recovery line, and drawing the recovery line to a rotor hook based on a rotation of the rotor.

An example aircraft includes a rotor assembly. The rotor assembly includes a first rotor having a first rotor hook with a first groove, and a second rotor having a second rotor hook with a second groove, where an opening of the second groove faces a direction opposite an opening of the first groove, and where at least one of the first or second grooves is to receive a recovery line when the rotor assembly contacts the recovery line.

An example apparatus includes means for generating a lift of a rotorcraft. The means for generating the lift has means for restraining a recovery line.

BRIEF DESCRIPTION OF THE DRAWINGS

FIGS. 4A-4C illustrate example steps of a rotorcraft recovery.

Figure 1:
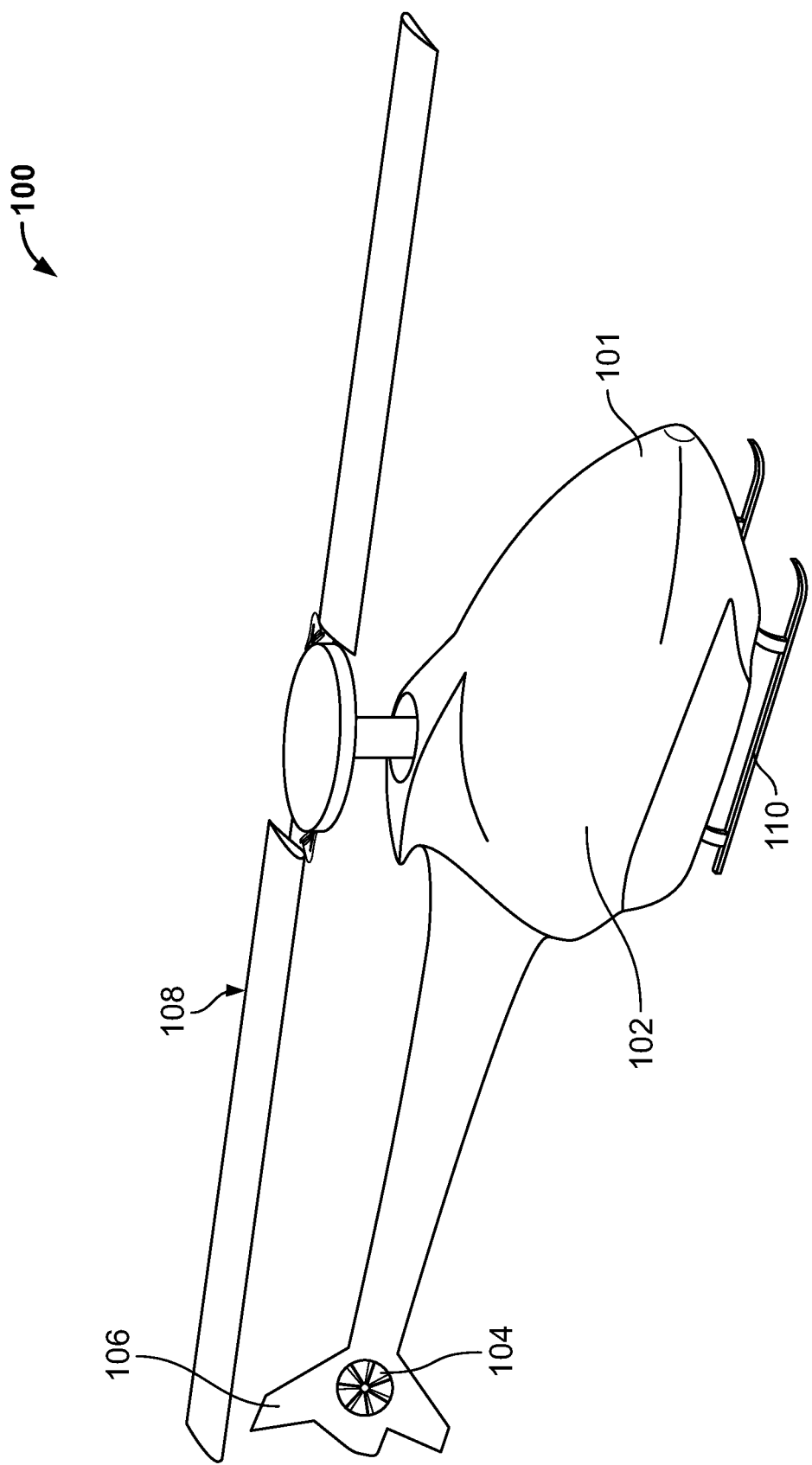
FIG. 1 is an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to recover rotorcraft are disclosed. Some unmanned aerial vehicles (UAVs) are implemented as rotorcraft. These UAV rotorcraft often require landing components and/or landing support systems that can adversely impact aerodynamic properties and/or weight and, thus, increase fuel consumption while reducing flight range. Further, UAV rotorcraft landing can take a significant amount of time to land.

Some known fixed wing UAVs are recovered by UAV recovery systems, which can subject the UAVs to significant loads due to a sudden deceleration during an impact with a recovery device. These significant loads can cause damage or necessitate strengthening components or features, thereby increasing cost and weight of the UAVs.

Example disclosed herein provide cost-effective recovery of rotorcraft (e.g., UAV rotorcraft) with little or negligible impact forces. Accordingly, examples disclosed herein enable relatively light-weight rotorcraft that do not necessitate landing components and/or reinforcing components for withstanding significant impact forces during recovery. Accordingly, weight is saved and, in turn, a flight range can be increased based on increased fuel efficiency. Further, examples disclosed enable rotorcraft to be recovered relatively quickly without a need for precise navigational control.

As used herein, the term "rotor hook" refers to a component and/or assembly that is mounted on or proximate a rotor and used to retain a recovery line, rope and/or cable. As used herein, the term "lock" refers to a mechanical and/or electromechanical device, component and/or assembly used to restrain or lock one component to another.

FIG. 1 is an example aircraft 100 in which examples disclosed herein can be implemented. In this particular example, the aircraft 100 is implemented as a UAV rotorcraft. The aircraft 100 of the illustrated example includes a nose portion (e.g., a navigation or control portion) 101, a fuselage or body 102, a tail 104 with a tail rotor 106 and a main rotor (e.g., a main rotor assembly) 108. In some examples, the aircraft 100 includes landing struts or supports 110.

In operation, the aircraft 100 is self-navigated and/or controlled via an external network communicatively coupled to the nose portion 101. To direct movement of the aircraft 100 during flight, the rotor assembly 108 spins to generate a lift of the aircraft 100 while the tail rotor 106 counteracts torque from the main rotor 108. When the aircraft 100 is moved toward a landing pad or surface during a landing maneuver, the main rotor 108 and the tail rotor 106 are controlled in a coordinated manner to enable a controlled descent so that the struts or supports 110 are brought into contact with the landing pad/surface. This controlled descent can take a significant amount of time.

While the example of FIG. 1 is shown in the context of a UAV rotorcraft, examples disclosed herein can be applied to any vehicle with a rotor or a propeller, such as, but not limited to, a manned rotorcraft, a fixed wing aircraft (e.g., a fixed wing aircraft with a propeller), a boat, a submarine, a quadcopter, a gyrocopter, vertical takeoff and landing (VTOL) aircraft, short takeoff and landing (STOL) aircraft, etc. In some examples disclosed herein, the struts or supports 110 are not implemented.

Figure 2:
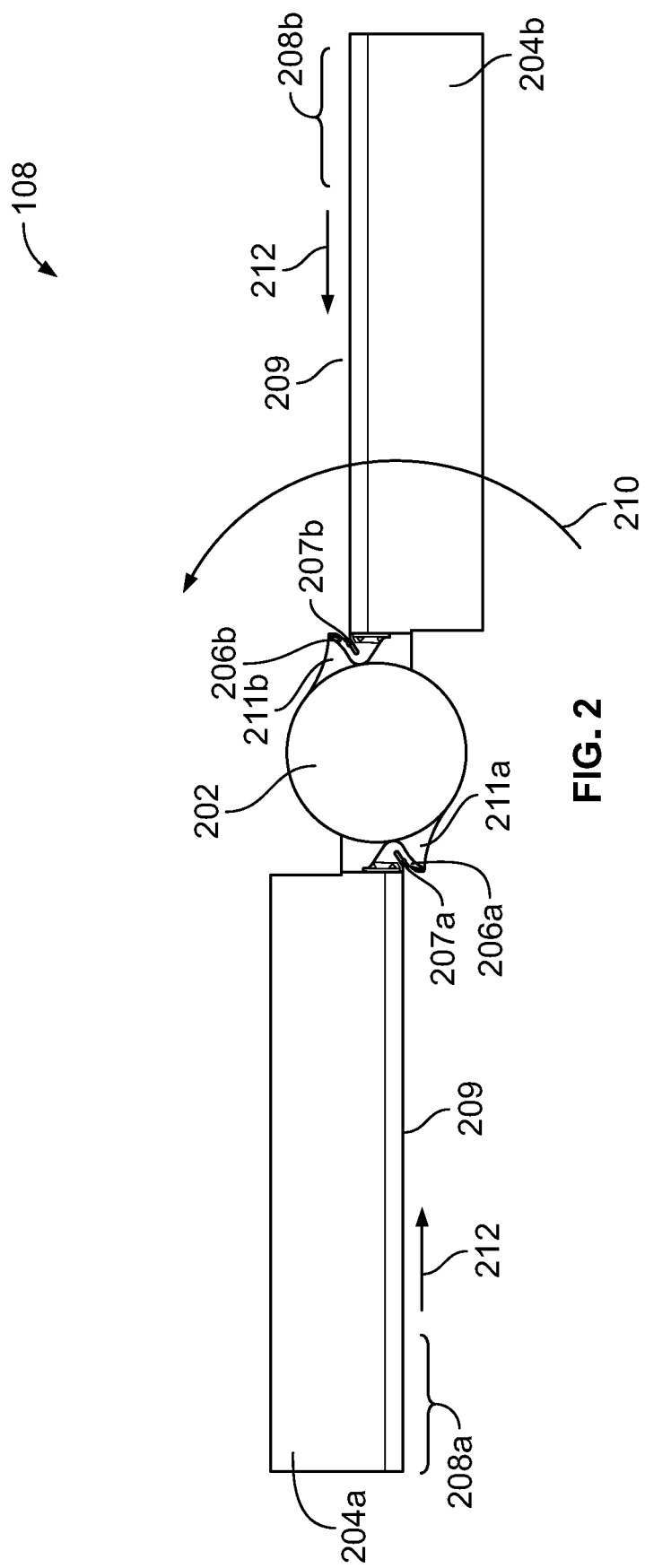
FIG. 2 illustrates an example rotor assembly in accordance with the teachings of this disclosure.

FIG. 2 illustrates the example rotor assembly 108 in accordance with the teachings of this disclosure. The rotor assembly 108 of the illustrated example includes a rotor hub (e.g., a rotating hub) 202, rotors (e.g., means for generating lift) 204 (hereinafter 204a, 204b, etc.), and rotor hooks (e.g., means for restraining) 206 (hereinafter 206a, 206b, etc.) with corresponding grooves 207 (hereinafter 207a, 207b). In this example, the rotors 204a, 204b are staggered relative to one another (e.g., offset along a center axis). Further, the rotors 204a, 204b include respective outer portions 208a, 208b, respectively, with leading edges 209 in this example.

To engage at least one of the rotor hooks 206a, 206b with a recovery line (e.g., a recovery rope, a recovery cable, etc.) 402 (shown in FIG. 4), the aircraft 100 is flown and/or hovered proximate to the recovery line 402 with the rotors 204a, 204b rotating along a direction generally indicated by an arrow 210, thereby causing the recovery line 402 to contact either the portion 208a or the portion 208b. As a result, at least a portion of the recovery line 402 contacts and moves along the leading edge 209 in a direction generally indicated by an arrow 212. Further, rotation of the rotors 204a, 204b moves the recovery line 402 into at least one the grooves 207a, 207b of the respective rotor hooks 206a, 206b to constrain the aircraft 100 to the recovery line 402. In particular, as the recovery line 402 is coupled and/or constrained to the at least one of the rotor hooks 206a, 206b, the aircraft 100 is decelerated to a rest. In this example, the grooves 207a, 207b have corresponding openings that face in opposing directions to facilitate multiple engagement points with the recovery line 402. In particular, the recovery line 402 can engage both of the hooks 206a, 206b in this example. While in this example, the recovery line 402 contacts either portion 208a or the portion 208b, in other examples, the recovery line 402 can initially contact any portion of the rotor hub 202 or the leading edges 209. In such examples, the rotation of the rotors 204a, 204b similarly moves the recovery line 402 to at least one of the rotor hooks 206a, 206b. In the illustrated example of FIG. 2, fairings 211a, 211b are disposed between the rotor hub 202 and the respective rotor hooks 206a, 206b to enable the recovery line 402 to slide from the rotor hub 202 and into one of the grooves 207a, 207b of one of the rotor hooks 206a, 206b. In other examples, fairings may not be provided.

In some other examples, the rotor hooks 206a, 206b are implemented in the tail rotor 206 instead. While two of the rotor hooks 206a, 206b are shown in this example, any appropriate number of rotor hooks 206 can be used instead (e.g., one, three, four, five, six, seven, eight, nine, etc.). In some other examples, the rotor hooks 206a, 206b are implemented on a fixed wing aircraft propeller or rotors of a quadcopter (e.g., a UAV quadcopter).

Figure 3A:
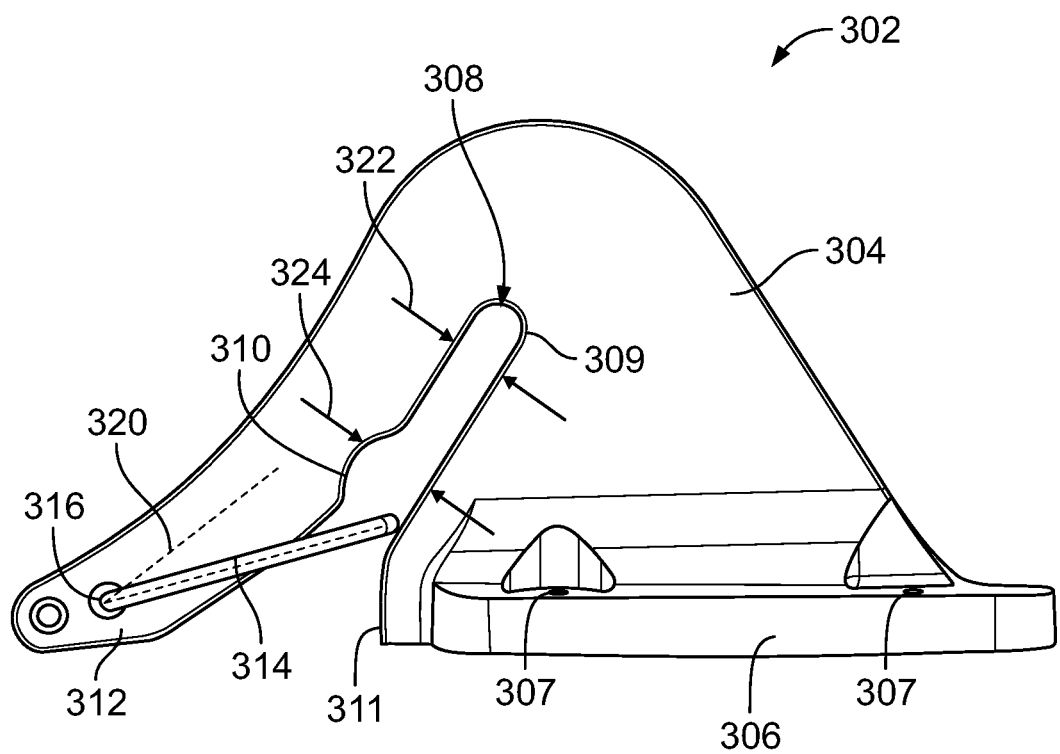
FIGS. 3A and 3B are detailed views of example rotor hooks that can be implemented in examples disclosed herein.
Figure 3B:
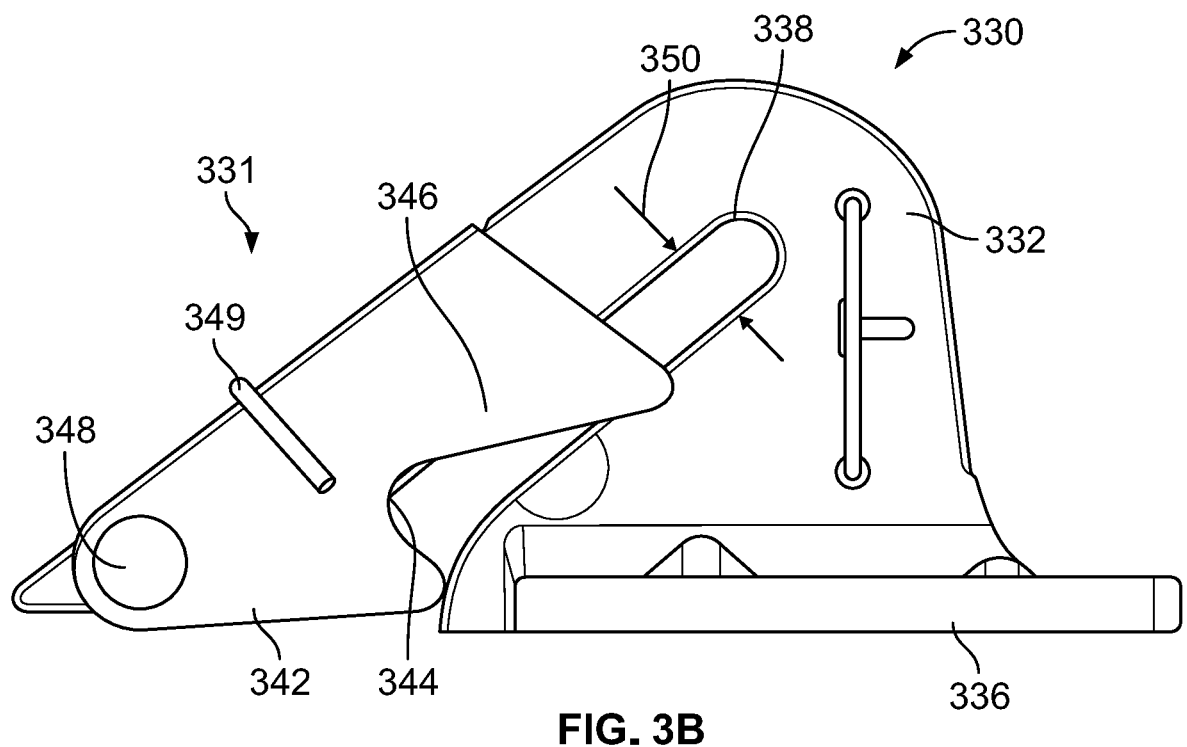

FIGS. 3A and 3B are detailed views of example rotor hooks 302, 330, respectively, both of which can be implemented in examples disclosed herein. In particular, the examples of FIGS. 3A and 3B can be used to implement any of the rotor hooks 206 shown and described above in connection with FIG. 2. Turning to FIG. 3A, the example rotor hook 302 is shown. According to the illustrated example, the rotor hook 302 includes a curved support body 304, a mounting flange 306 with fastener openings 307, and a groove or channel (e.g., a capture groove, a rope groove, etc.) 308. According to the illustrated example, the groove 308 includes a narrow portion 309, a wider recess portion 310 and an entry portion 311. The example rotor hook 302 also includes a curved lead-in portion 312. In some examples, the rotor hook 302 includes a lock (e.g., a pivot lock, a pivoting lock, a pivoting lever, a means for locking) 314 that rotates about a pivot 316.

To retain the recovery line 402 in the rotor hook 302, the recovery line 402 is brought into the entry portion 311 as the rotors 204a, 204b contact the recovery line 402. The spinning motion of the rotors 204a, 204b causes the recovery line 402 to contact the lock 314 and, in turn, rotate the lock 314 about the pivot 316. The example lock 314 is rotationally constrained to rotate at a defined angular range, as generally indicated by an angular range 320. Subsequent to the recovery line 402 moving past the lock 314, the recovery line 420 is drawn toward the recess portion 310 and into the narrow portion 309 based on the movement of the rotors 204a, 204b. In this example, the recovery line 402 is prevented from moving out from the lock 314 based on the aforementioned angular range of the lock 314. In other words, movement of the recovery line 402 from the groove 308 toward the lock 314 does not cause the lock 314 to rotate away from the recovery line 402, in this example. In some examples, manual movement or rotation of the lock 314 is necessitated to release the recovery line 402.

In some examples, the lock 314 is spring-loaded. In some other examples, the lock 314 relies on a linear motion instead of an angular rotational motion (e.g., a linear sliding lock or clasp, etc.). In some examples, the rotor hook 302 includes multiple ones of the locks 314 that are spaced along a length of the groove 308 (e.g., evenly spaced or staggered). In such examples, the multiples ones of the locks 314 can be pivoting. In other examples, the rotor hook 302 does not implement any of the locks 314.

In some examples, the channel 308 has a width (e.g. a groove width) of approximately 0.052 inches to 0.060 inches (e.g., 0.056 inches), as generally indicated by a dimension 322 shown in FIG. 3A, while the recess portion 310 has a width of approximately 0.136 to 0.144 inches (e.g., 0.140 inches), as generally indicated by a dimension 324, and the example recovery line 402 has a diameter of approximately 0.250 inches. In particular, the recovery line 402 is compressed to fit within the channel 308 and the recess portion 310. In such examples, a ratio of the width of the channel 308 to the diameter of the recovery line 402 can range from approximately 0.20 (e.g., 0.208) to 0.24. For example, the ratio may be 0.224. Further, a ratio of the width of the recess portion 310 to the diameter of the recovery line 402 can range from approximately 0.54 (e.g., 0.544) to 0.58 (e.g., 0.576). For example, the ratio can be 0.56. However, these dimensions are only examples and any appropriate dimensions based on application and/or desired design parameters can be used instead.

Turning to FIG. 3B, the example rotor hook 330 is similar to the rotor hook 302 described above in connection with FIG. 3A but, instead, includes a lock (e.g., a clasping lock, a rotatable locking clasp, a rotatable cam, etc.) 331 that acts as a clasp, in this example. The rotor hook 302 also includes a support body 332, and a mounting flange 336.

The lock 331 of the illustrated example exhibits a generally ramped shape. The example lock 331 includes a first ramped portion 342, a round edge portion (e.g., a round divot, a round scallop, etc.) 344, a second ramped portion 346 positioned proximate the round edge portion 344, and a pivot 348. In some examples, the lock 331 includes a retainer 349. Additionally or alternatively, the lock 331 is spring-loaded and/or the retainer 349 acts as a spring to affect an angular rotation of the lock 331.

In operation, when the recovery line 402 contacts the first ramped portion 342, the lock 331 rotates, thereby enabling the recovery line 402 to be placed in the round edge portion 344 and into a channel 338 based on an additional rotation of the lock 331, for example. In other words, the lock 331 can exhibit a ratcheting motion when the recovery line 402 is placed into the rotor hook 330 and retained by the lock 331. In some examples, multiple portions of the recovery line 402 are held by the lock 331.

In some examples, the channel 338 has a width of approximately 0.130 inches to 0.150 inches (e.g., 0.140 inches), as indicated by a dimension 350 shown in FIG. 3B, while the recovery line 402 has a diameter of 0.250 inches. In such examples, a ratio of the width to the diameter of the channel 338 can range from approximately 0.52 to 0.60 (e.g., the ratio can be 0.56). However, these dimensions are only examples and any appropriate dimensions based on application and/or desired design parameters can be used instead.

FIGS. 4A-4C illustrate example steps of a rotorcraft recovery. Turning to FIG. 4A, the aircraft 100 is shown flying toward the aforementioned recovery line 402. In this example, the recovery line 402 is implemented as a rope (e.g., an elastic rope) or cable and shown supported by a support structure (e.g., a fixed support structure) 404.

According to the illustrated example of FIG. 4A, the rotors 204 are spinning along with the corresponding rotor hooks 206, and the aircraft 100 moves to contact the recovery line 402 with the rotors 204. For example, distal portions or ends of the rotors 204 are brought into contact with the recovery line 402 based on motion of the aircraft 100.

In some examples, the recovery line 402 is suspended from another vehicle or vessel (e.g., a UAV, a boat, an aircraft, submarine, etc.). In other examples, the recovery line 402 is suspended from a building or other land-based structure. In other examples, the recovery line 402 is held taut at its opposite ends.

FIG. 4B depicts the aircraft 100 as the recovery line 402 is drawn inward toward the rotor hub 202 by the rotors 204. As a result, the recovery line 402 slides towards the rotor hooks 206. According to the illustrated example, the aircraft 100 undergoes deceleration as the spinning rotors 204 engage the recovery line 402.

FIG. 4C depicts the aircraft 100 as additional rotation of the rotors 204 causes the recovery line 402 to be wrapped around the rotor hub 202, for example. According to the illustrated example, the aircraft 100 is restrained and/or held by the recovery line 402. In other words, the recovery line 402 is wound around the aircraft 100 to suspend the aircraft 100 above the ground.

Figure 5:
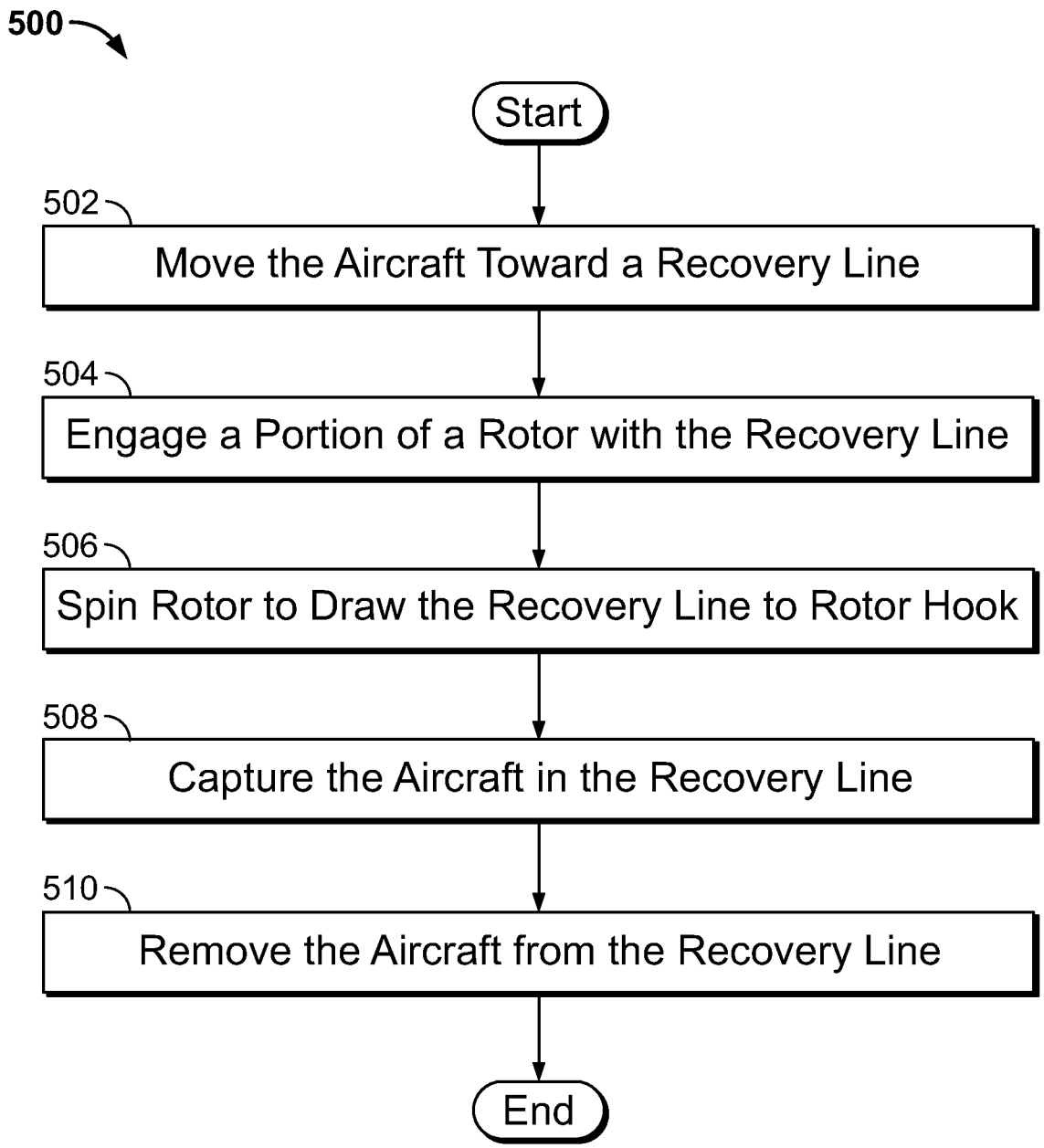
FIG. 5 is a flowchart representative of an example method to implement examples disclosed herein.

FIG. 5 is a flowchart representative of an example method 500 to implement examples disclosed herein. The example method 500 begins as the aircraft 100, which is implemented as a UAV rotorcraft in this example, has completed a mission and is to be recovered.

According to the illustrated example, the aircraft 100 is moved toward the recovery line 402 (block 502). In this example, the aircraft 100 is navigated so that the portion 208 of the rotor 204 is directed toward the recovery line 402. However, in other examples, any portion of the rotor hub 202 or the leading edges 209 can be directed at the recover line 402.

In this example, as the aircraft 100 is moved toward the recovery line 402, the portion 208 of the rotor 204 engages and/or contacts the recovery line 402 (block 504).

Next, the example rotor 204 continues to spin to draw the recovery line 402 into the rotor hook 206 (block 506). In particular, the recovery line 402 is moved into the corresponding groove 207 of the rotor hook 206 as the rotor 204 spins after contacting the recovery line 402. In some examples, the recovery line is caused to wrap around the aircraft 100.

The aircraft 100 of the illustrated example is captured in the recovery line 402 (block 508). In particular, the aircraft 100 is suspended above ground based on the recovery line 402 being wound around the aircraft 100.

Next, the aircraft 100 is removed from the recovery line 402 (block 510) and the process ends. In this example, the recovery line 402 is removed from the rotor hooks 206 and unwound from the aircraft 100 while the aircraft 100 is suspended from the ground.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example 1 includes an apparatus having a rotor of a vehicle, a rotatable hub to support the rotor, and a rotor hook disposed on the rotor, the rotor hook having a groove to receive a recovery line. The rotor is to contact the recovery line when the vehicle is flown toward the recovery line.

Example 2 includes the apparatus of Example 1, and further includes a lock coupled to the rotor hook to restrain the recovery line to the rotor hook.

Example 3 includes the apparatus of Example 2, where the lock includes a pivoting lever.

Example 4 includes the apparatus of Example 1, where a ratio of a width of the groove to a diameter of the recovery line is between 0.20 and 0.24.

Example 5 includes the apparatus of Example 1, where the rotor hook is disposed proximate the rotatable hub.

Example 6 includes the apparatus of Example 1, where the recovery line is to contact a leading edge of the rotor and move toward the rotor hub and into the rotor hook.

Example 7 includes the apparatus of Example 6, where the rotor is to contact the recovery line at a distal end of the rotor.

Example 8 includes the apparatus of Example 1, where the vehicle is an unmanned aerial vehicle (UAV).

Example 9 includes a method that includes moving the aircraft toward a suspended recovery line, contacting a portion of a rotor of the aircraft with the recovery line, and drawing the recovery line to a rotor hook based on a rotation of the rotor.

Example 10 includes the method of Example 9, and further includes restricting, via a lock, the recovery line to the rotor hook.

Example 11 includes the method of Example 10, where restraining the recovery line includes rotating a pivoting lever to constrain the recovery line in a groove of the rotor hook.

Example 12 includes the method of Example 9, where the portion of the rotor includes a distal portion of the rotor.

Example 13 includes the method of Example 9, where drawing the recovery line to a rotor hook including moving the recovery line toward a rotating hub.

Example 14 includes an aircraft having a rotor assembly. The rotor assembly includes a first rotor having a first rotor hook with a first groove, and a second rotor having a second rotor hook with a second groove, where an opening of the second groove faces a direction opposite an opening of the first groove. At least one of the first or second grooves is to receive a recovery line when the rotor assembly contacts the recovery line.

Example 15 includes the aircraft of Example 14, and further includes a lock to retain the recovery line.

Example 16 includes the aircraft of Example 15, where the lock includes a pivoting lever.

Example 17 includes the aircraft of Example 16, where the pivoting lever is spring-loaded.

Example 18 includes the aircraft of Example 14, where a ratio of a groove width of each of the first and second grooves to a diameter of the recovery line is between 0.20 and 0.24.

Example 19 includes the aircraft of Example 14, where the rotor assembly defines a propeller of a fixed wing aircraft.

Example 20 includes the aircraft of Example 14, where the first rotor hook is positioned at a proximate end of the first rotor and the second rotor hook is positioned at proximate end of the second rotor.

Example 21 includes an apparatus having means for generating a lift of a rotorcraft. The means for generating the lift has means for restraining a recovery line.

Example 22 includes the apparatus of Example 21, and further includes means for locking the recovery line to the means for restraining the recovery line.

From the foregoing, it will be appreciated that example methods, apparatus and articles of manufacture have been disclosed that provide effective recovery of rotorcraft with little or negligible impact forces. Accordingly, examples disclosed herein enable relatively light-weight rotorcraft that do not necessitate landing components and/or reinforcing components to withstand significant impact forces during recovery. Further, these weight reductions can have positive effects on aerodynamic properties and, thus, increase a flight range.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to UAV rotorcraft, examples disclosed herein can be applied to any rotorcraft or rotor applications, such as boats, fixed-wing aircraft, submersibles, etc.

What is claimed is:

1. A method of recovering an aircraft, the method comprising:
    moving the aircraft toward a suspended recovery line;
    contacting a portion of a rotor of the aircraft with the recovery line; and
    drawing the recovery line to a rotor hook based on a rotation of the rotor, the rotor hook positioned on a rotatable hub, the rotatable hub configured to support and rotate the rotor.

2. The method as defined in claim 1, further including restricting, via a lock, the recovery line to the rotor hook.

3. The method as defined in claim 2, wherein restricting the recovery line includes rotating a pivoting lever to constrain the recovery line in a groove of the rotor hook.

4. The method as defined in claim 1, wherein the portion of the rotor includes a distal portion of the rotor.

5. The method as defined in claim 1, wherein drawing the recovery line to the rotor hook includes moving the recovery line toward the rotatable hub.

6. The method as defined in claim 1, wherein drawing the recovery line to the rotor hook includes drawing the recovery line to a groove of the rotor hook.

7. The method as defined in claim 1, wherein contacting the portion of the rotor of the aircraft with the recovery line includes causing a distal end of the rotor to contact the recovery line.

8. The method as defined in claim 1, further including unwinding the aircraft from the recovery line.

9. The method as defined in claim 1, wherein drawing the recovery line to the rotor hook includes suspending the aircraft with the recovery line.

10. The method as defined in claim 1, wherein drawing the recovery line to the rotor hook causes the recovery line to wrap around the aircraft.

11. A method for recovering an aircraft, the method comprising:
    moving a rotor of the aircraft towards a recovery line; and
    capturing the recovery line in a rotor hook, the rotor hook positioned on a rotatable hub, the rotatable hub configured to support and rotate the rotor.

12. The method as defined in claim 11, wherein capturing the recovery line in the rotor hook includes capturing the recovery line in a groove of the rotor hook.

13. The method as defined in claim 12, wherein capturing the recovery line includes rotating a pivoting lever to constrain the recovery line in the groove of the rotor hook.

14. The method as defined in claim 11, wherein capturing the recovery line in the rotor hook includes restraining the recovery line to the rotor hook via a lock, the lock coupled to the rotor hook.

15. The method as defined in claim 11, wherein moving the rotor of the aircraft towards the recovery line includes rotating the rotor, wherein the rotation of the rotor causes at least a portion of the recovery line to be drawn towards the hook.

16. The method as defined in claim 11, wherein capturing the recovery line in the rotor hook includes moving the recovery line toward the rotatable hub.

17. The method as defined in claim 11, wherein moving the rotor of the aircraft to the recovery line includes contacting the recovery line at a distal end of the rotor.

18. The method as defined in claim 11, further including unwinding the aircraft from the recovery line.

19. An aircraft comprising:
a first rotor;
a second rotor; and
a rotatable hub configured to support the first and second rotors, the first and second rotors extending from the rotatable hub such that the first and second rotors have a common axis of rotation, the rotatable hub having a first rotor hook with a first groove, the rotatable hub having a second rotor hook with a second groove, wherein an opening of the second groove faces a direction opposite an opening of the first groove, and wherein at least one of the first or second grooves is configured to receive a recovery line when at least one of the first and second rotors contacts the recovery line such that the rotation of the at least one of the first and second rotors causes at least a portion of the recovery line to be drawn toward and captured by at least one of the first or second grooves to recover the aircraft during flight thereof.

20. The aircraft as defined in claim 19, further including a first lock operatively coupled to the first rotor hook and a second lock operatively coupled to the second rotor hook, the first lock configured to retain the recovery line when the first groove receives the at least the portion of the recovery line and the second lock configured to retain the recovery line when the second groove receives the at least the portion of the recovery line.

* * * * *